(12) United States Patent
Kitagawa

(10) Patent No.: US 8,155,289 B2
(45) Date of Patent: Apr. 10, 2012

(54) REMOTE CONTROL SYSTEM FOR ELECTRIC DEVICE

(75) Inventor: Isamu Kitagawa, Kasugai (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 1413 days.

(21) Appl. No.: 11/727,855

(22) Filed: Mar. 28, 2007

(65) Prior Publication Data

US 2008/0044006 A1 Feb. 21, 2008

(30) Foreign Application Priority Data

Mar. 30, 2006 (JP) ................................. 2006-093137

(51) Int. Cl.
*H04M 11/00* (2006.01)
(52) U.S. Cl. .......... 379/102.01; 379/102.07; 379/110.01
(58) Field of Classification Search ............. 379/102.01, 379/102.02, 102.03, 102.04, 102.05, 102.07, 379/110.01
See application file for complete search history.

(56) References Cited

U.S. PATENT DOCUMENTS

| | | | | |
|---|---|---|---|---|
| 5,138,649 A | * | 8/1992 | Krisbergh et al. | 455/420 |
| 5,671,267 A | * | 9/1997 | August et al. | 379/102.03 |
| 5,802,467 A | * | 9/1998 | Salazar et al. | 455/420 |
| 5,963,624 A | * | 10/1999 | Pope | 379/110.01 |
| 6,628,964 B1 | * | 9/2003 | Bates et al. | 455/556.1 |
| 2003/0163222 A1 | * | 8/2003 | Choi | 379/102.05 |
| 2003/0219108 A1 | * | 11/2003 | Sasaki | 379/102.03 |
| 2006/0023847 A1 | * | 2/2006 | Tyroler et al. | 379/102.01 |

FOREIGN PATENT DOCUMENTS

| | | |
|---|---|---|
| JP | A 5-41745 | 2/1993 |
| JP | A 9-98252 | 4/1997 |
| JP | A 11-68893 | 3/1999 |
| JP | A 11-284757 | 10/1999 |
| JP | A 2001-275171 | 10/2001 |
| JP | A 2002-232972 | 8/2002 |
| JP | A 2003-189377 | 7/2003 |
| JP | A 2004-194148 | 7/2004 |
| JP | A 2005-65259 | 3/2005 |

* cited by examiner

*Primary Examiner* — Stella Woo
(74) *Attorney, Agent, or Firm* — Oliff & Berridge, PLC

(57) ABSTRACT

A remote control system for at least one electric device, each electric device having device identification data, has a handset comprising a handset transceiver, and a base unit having a telephone function to make a call. The base unit has a base unit transceiver that communicates with the handset wireless transceiver bidirectionally, and a primary remote-controller that communicates the electric device bidirectionally to control the electric device. The primary remote-controller has a remote-control transmitter and a remote-control receiver. The remote-control transmitter transmits control data to the electric device by using the device identification data, the control data being used for controlling the electric device. The remote-control receiver receives response data from the electric device in response to the control data.

18 Claims, 15 Drawing Sheets

| BUTTON NUMBER 71 | DEVICE ID 72 |
|---|---|
| 1 | abcd |
| 2 | ABCD |
| 3 | EFGH |

80

404b

| PRODUCT TYPE 81 | MANUFACTURER 82 | DEVICE ID 72 |
|---|---|---|
| LIGHTING | XXXX | ABCD |
| AIR CONDITIONER | YYYY | abcd |
| TELEVISION | ZZZZ | EFGH |
| STEREO | QQQQ | αβγ |

404f

| DEVICE ID 72 | BUTTON NUMBER 71 | 73 |
|---|---|---|
| abcd | 1 | 0 |
| ABCD | 2 | 0 |
| EFGH | 3 | 1 |

「0」…OFF
「1」…ON

| 81 | 82 | 73 |
|---|---|---|
| AIR CONDITIONER | XXXX | OFF |
| LIGHTING | YYYY | OFF |
| TV | ZZZZ | ON |
| ⋮ | | |

REMOTE CONTROL SYSTEM FOR ELECTRIC DEVICE

CROSS REFERENCE TO RELATED APPLICATIONS

This application claims priority from Japanese Patent Application No. 2006-093137 filed Mar. 30, 2006. The entire content of this priority application is incorporated herein by reference.

TECHNICAL FIELD

The present invention relates to a remote control system for electric device.

BACKGROUND

Japanese patent application publication No. HEI11-68893 discloses a wireless telephone system configured of a base unit and handsets by which a user can remotely control household electric devices, such as lighting and an air conditioner. Specifically, the user uses the communication function of the wireless telephone system to transmit a signal for controlling household electric devices from the handset to the base unit. Upon receiving this signal, the base unit outputs an infrared signal to the household electric device, enabling the user to control the electric devices remotely. The base unit and handsets of the wireless telephone system communicate with each other using conventional radio frequency signals. The user can command the base unit from a handset in a remote location from the base unit to transmit an infrared signal to electric devices in the vicinity of the base unit. The base unit uses an indoor infrared signal commonly used in infrared remote controllers for household appliances. The user can also transmit control signals directly to electric devices in the vicinity of the handset using an infrared transmitter provided in the handset.

However, remote control systems popularly used with household appliances can only transmit infrared signals in one direction from the remote control to the appliance. Currently, infrared signals are not transmitted in the opposite direction, which could enable the user of the remote controller to learn the status of the household appliances. As a result, the wireless telephone system described above can only transmit infrared signals from the base unit or handset to the electric devices. Hence, when the user wishes to remotely control a household appliance using a handset from a separate room, the user cannot visually confirm the operating state of the household appliance and, therefore, has no means of confirming with the handset whether the appliance has performed the desired operation. If the lens of the infrared transmitter is dirty, for example, preventing the infrared signal from reaching the household appliance, or if the household appliance cannot receive the signal due to some issue on the appliance side, the electric appliance will not be controlled as desired. By not being able to determine the status of the household appliances, the user cannot fully enjoy the benefits of remote control.

When the wireless telephone system supports remote control for a plurality of household appliances, the user cannot determine the control state of any appliance with either the base unit or handset, even such simple information as which appliances are on and which are off, because the base unit and handset receive no data feedback from the household appliances. Hence, the user cannot determine the control status of individual household appliances and perform desired control operations for each appliance individually, but can only perform limited control operations, such as switching the power off on all appliances at the same time.

In order to use infrared remote control communications to control the electric devices, conventional wireless telephone systems use infrared communications to communicate with the electric devices unidirectionally. Since infrared signals from a remote controller have an extremely short traveling distance and do not have a strong ability to pass through or around objects, an infrared signal used within a room or other space enclosed by walls are not likely to be transmitted outside the enclosed space. When a base unit employing infrared communications is used as the primary remote controller, for example, the base unit can only control appliances within the same room. Hence, if the structure of a wireless telephone system is used to control household appliances in each room that a base unit or handset is present, then an infrared signal transmitter must be provided in the handsets as well as the base unit. Further, the data transmission capacity in infrared communications is limited.

SUMMARY

It is an object of the present invention to provide a remote control system for electric device, and particularly a remote control system capable of reliably informing the control status of the household electric devices of the base unit or handset and capable of performing remote control more accurately and with greater control.

The present invention provides a remote control system for at least one electric device, each electric device having device identification data. The system has a handset comprising a handset transceiver, and a base unit having a telephone function to make a call. The base unit has a base unit transceiver that communicates with the handset wireless transceiver bidirectionally, and a primary remote-controller that communicates the electric device bidirectionally to control the electric device. The primary remote-controller has a remote-control transmitter and a remote-control receiver. The remote-control transmitter transmits control data to the electric device by using the device identification data, the control data being used for controlling the electric device. The remote-control receiver receives response data from the electric device in response to the control data.

The present invention provides a method for remote-control at least one electric device by using a remote-control system. Each electric device has device identification data. The remote-control system has a handset comprising a handset transceiver, and a base unit having a telephone function to make a call. The base unit has a base unit transceiver that communicates with the handset wireless transceiver bidirectionally, and a primary remote-controller that communicates the electric device bidirectionally to control the electric device. The primary remote-controller has a remote-control transmitter that transmits control data to the electric device by using the device identification data, a remote-control receiver that receives response data from the electric device in response to the control data, a detecting unit that detects the electric device, a storage that stores the device identification data associated with the electric device, and an display panel. The method includes transmitting an instruction for controlling the electric device from the handset to the base unit, transmitting the instruction as the control data from the base unit to the electric device, receiving a reaction of the electric device in response to the control data as the response data at the base unit, and transmitting the response data from the base unit to the handset.

BRIEF DESCRIPTION OF THE DRAWINGS

Illustrative aspects in accordance with the invention will be described in detail with reference to the following figures wherein:

FIG. 7 is an explanatory diagram showing the data structure of a device registration area, an auxiliary identification data storage area, and a control status management storage area;

FIG. 8 is an explanatory diagram showing example output for registered devices on a display;

DETAILED DESCRIPTION

Next, an embodiment of the present invention will be described while referring to the accompanying drawings.

Figure 1:
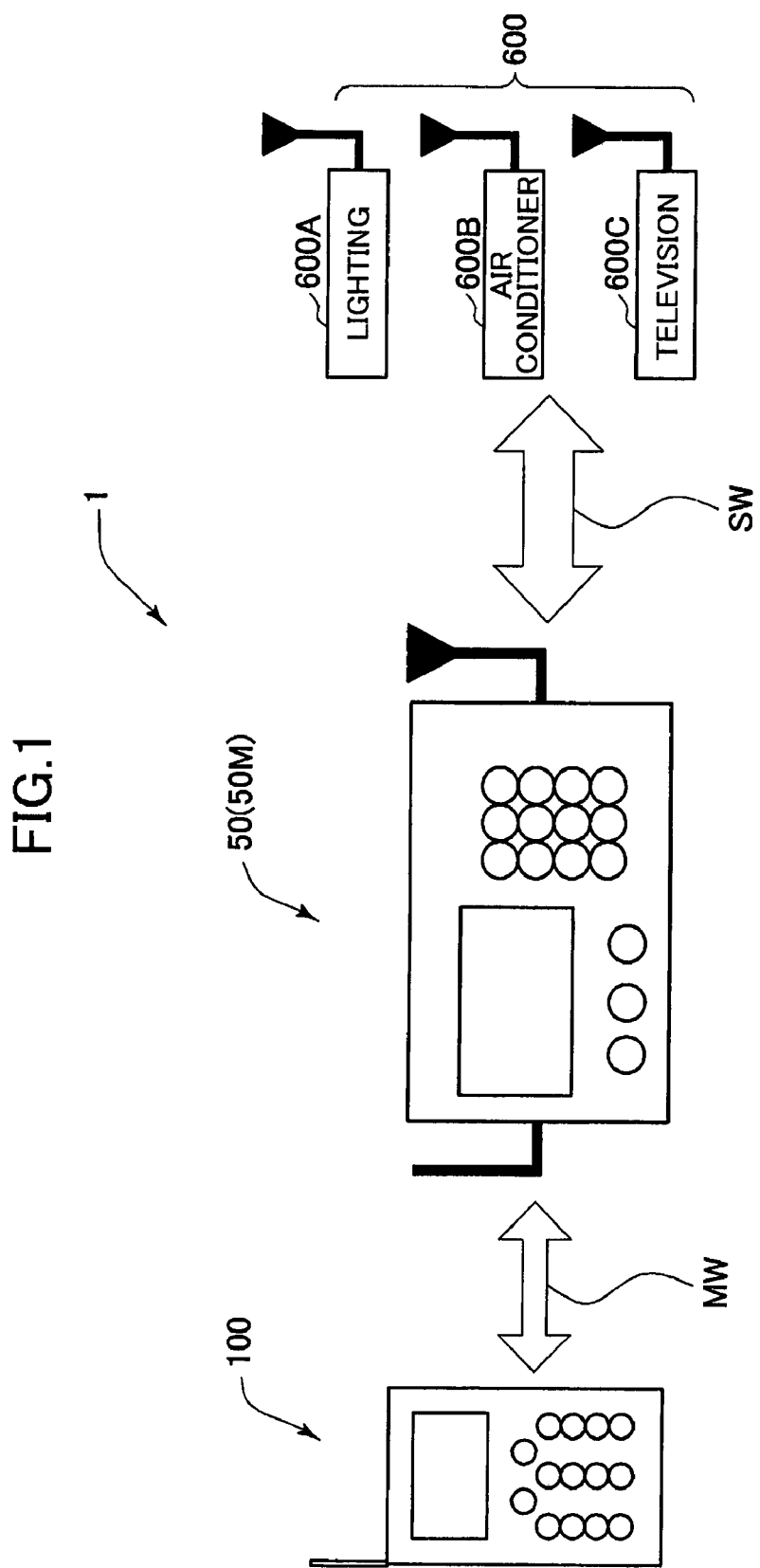
FIG. 1 is an explanatory diagram conceptually illustrating a remote control system according to the present invention.
Figure 3:
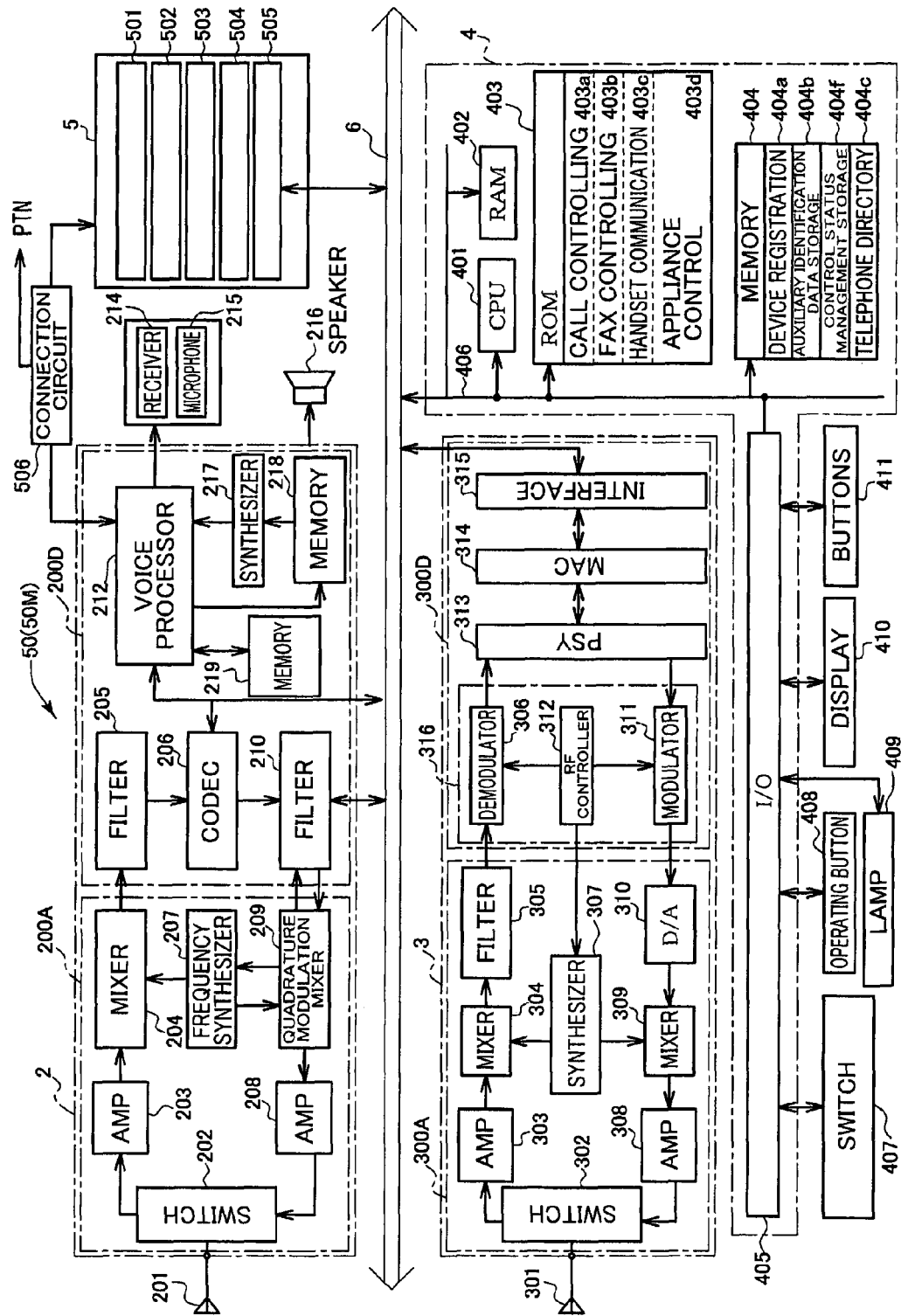
FIG. 3 is a block diagram showing the electrical structure of the base unit.

FIG. 1 shows a remote control system 1 according to an embodiment of the present invention. The remote control system 1 includes a base unit 50, and a handset 100. The base unit 50 serves as a primary remote controller 50M in the wireless telephone system 1. The primary remote controller 50M remotely controls electric devices 600. As shown in FIG. 3, the base unit 50 is configured of a base unit wireless transceiver 2, a primary controller wireless subtransceiver 3 (base unit wireless subtransceiver) 3, a main microcomputer 4, and a fax/copier unit 5 that are all connected via a bus line 6. The base unit wireless transceiver 2 and fax/copier unit 5 can also connect to an external telephone network via a connection circuit 506.

Figure 4:
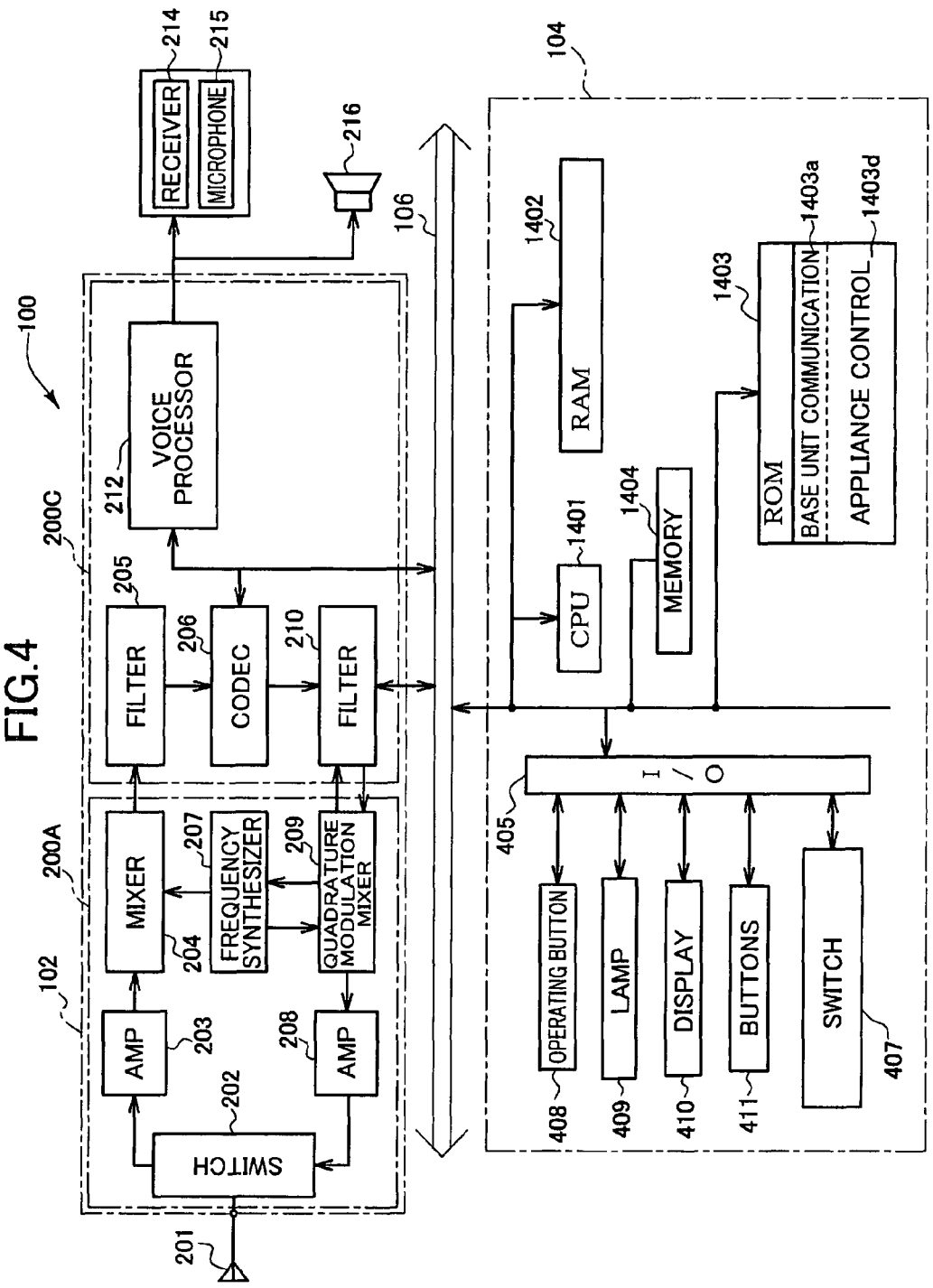
FIG. 4 is a block diagram showing the electrical structure of the handset.

As shown in FIG. 4, the handset 100 includes a handset wireless transceiver 102, and a main microcomputer 104 connected to each other via the bus line 106. As shown in FIG. 1, the base unit 50 and handset 100 can connect to each other via a first wireless communication network MW including the base unit wireless transceiver 2 in FIG. 3 and the handset wireless transceiver 102 in FIG. 4.

Figure 5:
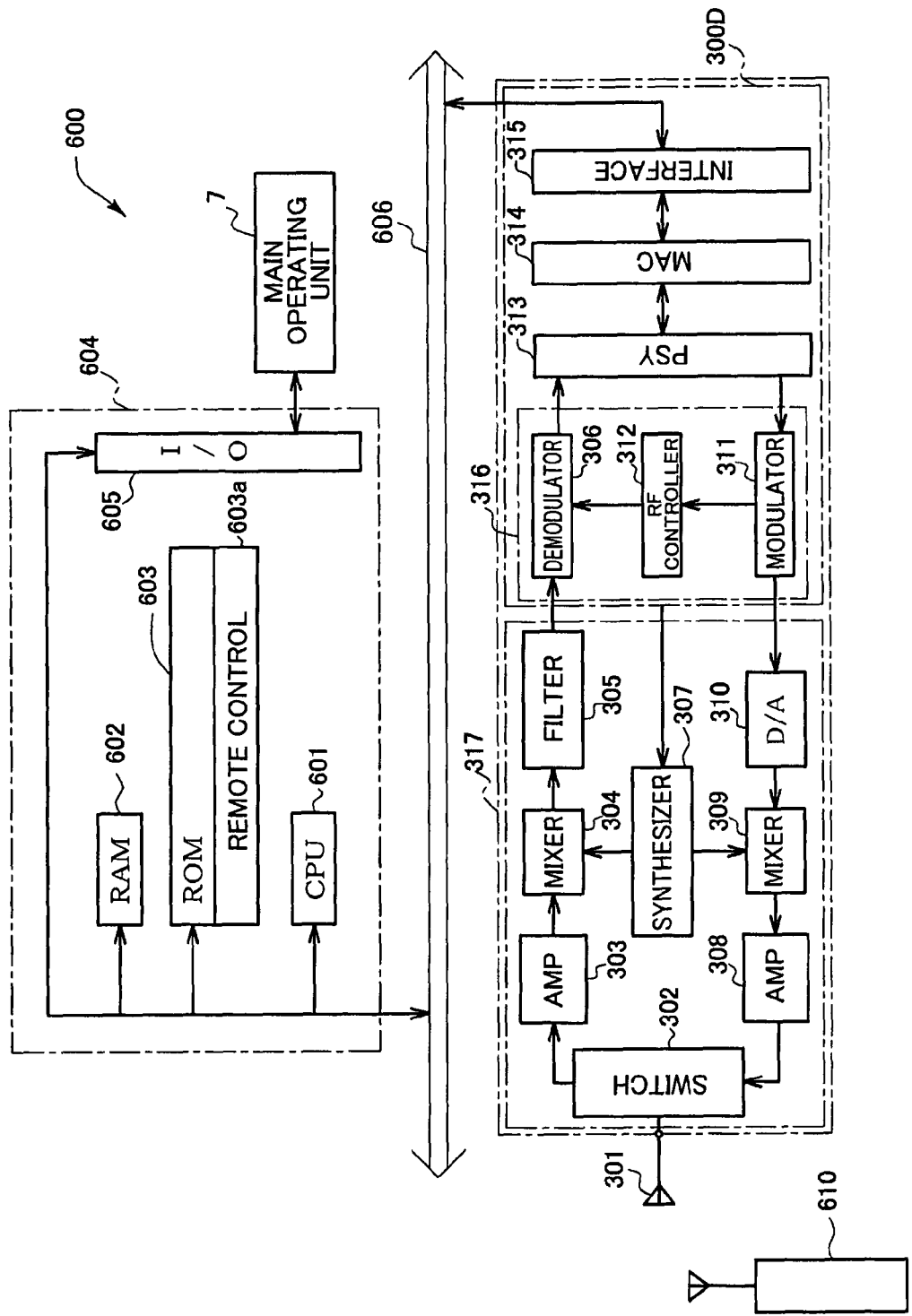
FIG. 5 is a block diagram showing the electrical structure of an electric device.

The electric devices 600 are configured of various household appliances. In this embodiment, the electric devices 600 include lighting 600A, an air conditioner 600B, and a television 600C. As shown in FIG. 5, each of the electric devices 600 includes a main microcomputer 604, and an electric appliance wireless transceiver 317 that are connected via the bus line 606. Further, a main operating circuit 7 unique to each electric appliance is connected to the main microcomputer 604. A second wireless communication network SW separate from the first wireless communication network MW is provided as shown in FIG. 1 for establishing a bi-directional wireless connection between the primary remote controller 50M and the electric devices 600, and specifically between the primary controller wireless subtransceiver 3 of the primary remote controller 50M and the electric appliance wireless transceiver 317 of each of the electric devices 600.

As shown in FIG. 3, the main microcomputer 4 of the primary remote controller 50M executes an appliance control application 403d to implement each of the following functions.

A control transmission data transmitting function for transmitting control transmission data to the electric devices 600 for controlling the electric devices 600 from the primary controller wireless subtransceiver 3

A response data receiving function for receiving data from the electric devices 600 on the primary controller wireless subtransceiver 3 in response to the control transmission data By providing the primary remote controller 50M with the control transmission data transmitting function for transmitting control transmission data to the electric device 600, and the response data receiving function for enabling the primary controller wireless subtransceiver 3 to receive data from the electric device 600 in response to the control transmission data using the second wireless communication network SW to implement these functions, the primary remote controller 50M (base unit 50) can reliably learn the control state on the electric device 600 side based on the response data. By referencing this response data, the user of the primary remote controller 50M can perform remote operations for controlling the electric devices 600 more accurately and in greater detail.

In this embodiment, a personal area network (PAN) compliant with IEEE (Institute of Electrical and Electronic Engineers) 802.15 may be used for the second wireless communication network SW. Bluetooth (trademark name; a specification stipulated in IEEE 802.15.1) or ZigBee (trademark name) may be used for the second wireless communication network SW.

The second wireless communication network SW linking the primary remote controller 50M (base unit 50) with the electric devices 600 is compliant with a short-distance bi-directional network employing a spread spectrum method in the microwave band, and more specifically the ZigBee specification. In the hierarchical structure of the ZigBee protocol shown in FIG. 15, the physical layer determines the physical connection/transmission method of the network. More specifically, the method for converting between data and electric signals (voltage, etc.) belongs to this layer. The specifications of the physical layer for ZigBee are stipulated in IEEE 802.15.4 as follows.

Figure 18:
FIG. 18 is an explanatory diagram showing the channel configuration in ZigBee.

As shown in FIG. 18, a total of 16 channels from Ch11-Ch26 are provided at 5-MHz intervals in the 2.4 GHz ISM band (industrial, scientific, and medical band).

Figure 19:
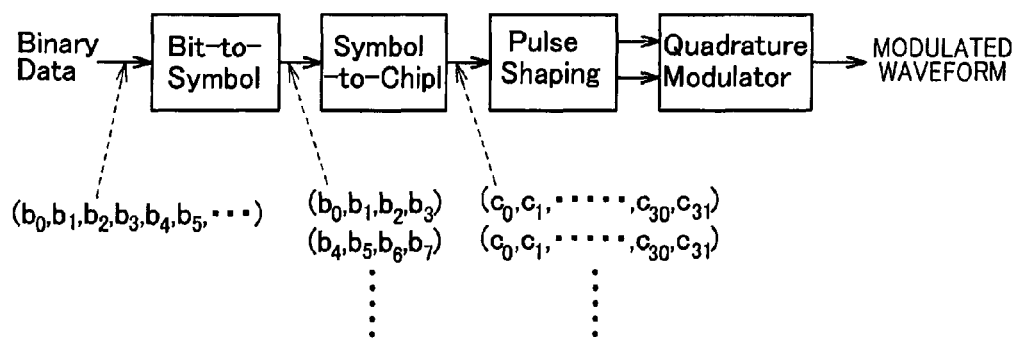
FIG. 19 is a flowchart illustrating a primary modulation process employed in ZigBee.
Figure 20:
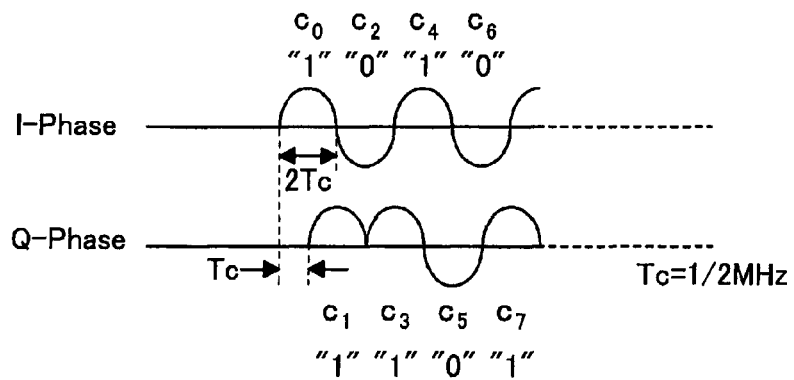
FIG. 20 is an explanatory diagram showing the phase relationship between an I-phase and Q-phase of quadrature amplitude modulation employed in the primary modulation process of FIG. 19.

The primary modulation method performed on a carrier signal according to a baseband signal is a method of multi-level modulation in which a plurality of bits are transmitted for one modulation. Specifically, this embodiment uses offset QPSK (quadrature phase-shift keying), or π/4-QPSK, that changes each of phase and amplitude of the carrier wave between four different levels in order to transmit 16 symbols in one modulation. As shown in FIG. 20, a quadrature modulator is used to modulate the amplitude of the waveforms for the I-phase (quadrature phase) and the Q-phase (quadrature phase) according to quadrature amplitude modulation (QAM, and specifically 16-QAM for transmitting 16 symbols). As shown in FIG. 19, transmitted binary data inputted into a modulator 311 (see FIGS. 3 and 5) is mapped onto the 16 symbols "$0_H$"-"$F_H$" for every four bits of data in the inputted order. Each symbol is further mapped onto 32 chips as binary data (0 or 1). The transmission rate is 250 kbits/sec (4 bits/symbol, 32 chips/symbol, 62.6 baud).

After performing primary modulation of the carrier wave with the baseband signal, secondary modulation is performed using a spread spectrum technique for spreading the frequency spectrum. The technique used in this embodiment is the direct-sequence spread spectrum (DSSS) technique.

The MAC layer (see FIG. 15) stipulates the method of transmitting and receiving frames, which are a unit of data transmission and reception, the frame format, and the method of error detection, for example. Specifications of the MAC layer stipulated in IEEE 802.15.4 are as follows.

In addition to a 64-bit MAC address, the MAC layer can set a 16-bit PAN-ID for the personal area network (PAN) and add a 16-bit short address for each device within the same PAN-ID, thereby simplifying address management on the network.

The following three device types are provided for the MAC layer.

A network coordinator (NC) having a network control function.

A full function device (FFD) having a function equivalent to the NC for communicating with the plurality of devices. In this embodiment, the NC is considered in a broad sense to belong in the same category as the FFD.

A reduced function device (RFD) having no network control function and being able to communicate only one-on-one with the FFD.

Channel access is achieved through carrier sense multiple access with collision avoidance (CSMA/CA). Each device transmits data after first confirming that the communication channel has been continuously idle for a prescribed time or greater. Further, a random wait time is added to a minimum wait time to prevent a plurality of devices from transmitting data simultaneously at a fixed time after the previous communication. Devices determine whether data has been actually transmitted properly based on whether an acknowledge signal has been received. If an acknowledge signal has not been received, the device assumes a collision has occurred and retransmits the data.

Figure 17:
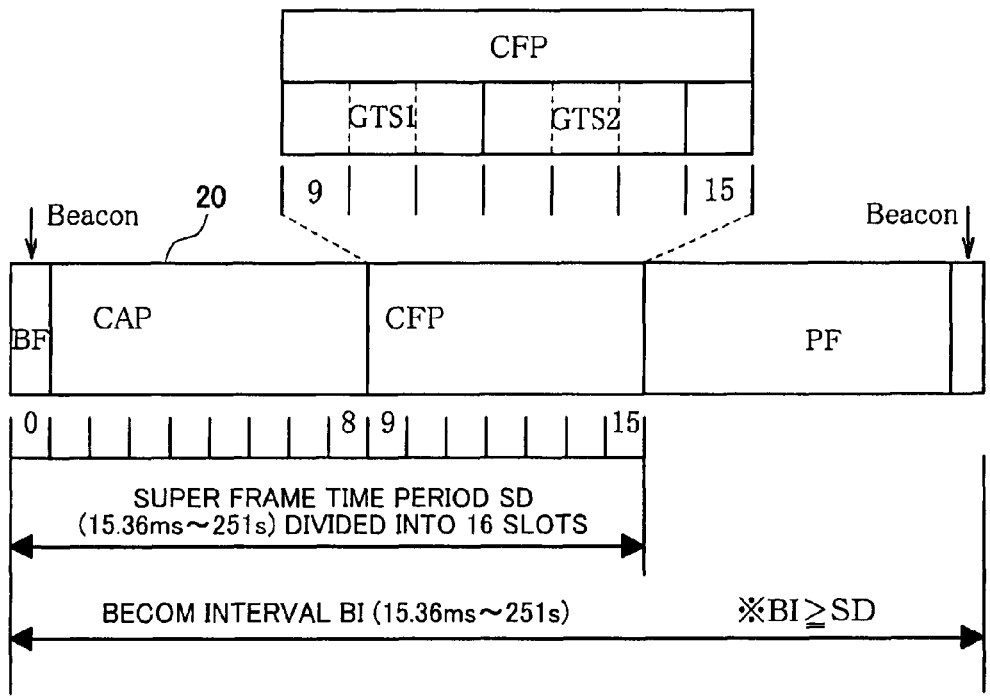
FIG. 17 is an explanatory diagram conceptually illustrating the structure of a communication frame used with ZigBee.

The transmission frame has a superframe structure using a beacon, as shown in FIG. 17. A beacon signal is embedded in the beacon field at the head of the frame. The frame interval is of fixed length, and each device transmits an uninterrupted data signal based on this superframe structure. Through this transmission, a beacon interval is set to the frame length, thereby transmitting a beacon signal at fixed intervals to construct a beacon-enabled PAN. Following the beacon field described above, the beacon interval (frame length) is divided into a contention access period (CAP) during which access is possible by all devices, a contention free period (CFP) in which access is only possible by a specific device, and an inactive period (PF) in which access is prohibited for all devices. The CFP is further divided into seven equal slots by a guaranteed time slot (GTS) mechanism. These time slots can be allocated to devices that need to perform communications on a priority basis (such as household devices trying to perform a control process). FIG. 17 shows an example in which three of the seven equal time intervals divided by the GTS mechanism have been assigned to each of a GTS1 and GTS2. Devices assigned to these time periods can perform priority data transmission and reception. All devices on the PAN detect the existence of the beacon signal and begin a process to acquire the frame when a beacon signal is detected. The devices enter a sleep mode when the gap between beacon signals exceeds a prescribed time.

Figure 15:
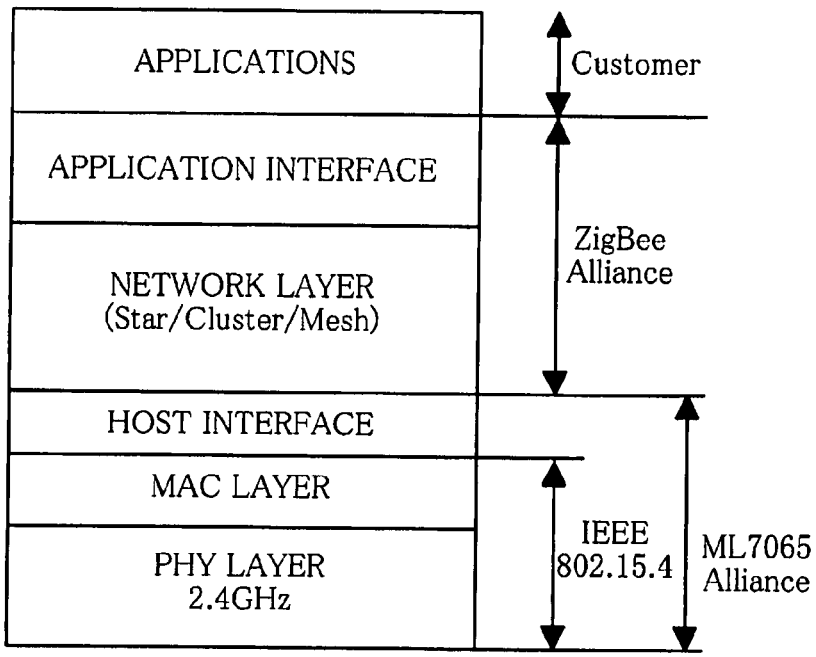
FIG. 15 is an explanatory diagram showing the general hierarchical structure of the ZigBee protocol.

The host interface layer (synchronous interface layer) shown in FIG. 15 determines specifications for synchronizing data communications with a host microcomputer (the main microcomputer 4 for the base unit 50 in FIG. 3, and the main microcomputer 604 for the electric device 600 in FIG. 5) in order to execute an application so that specifications can be uniquely determined for each device. For example, a digital processor 300D (see FIGS. 3 and 5) in this embodiment employs an LSI for ZigBee communications (product name ML7065, manufactured by Oki Electric Industry Co.). The host interface layer is configured of a synchronous communication interface (SCI) unit 315 (see FIGS. 3 and 5) that transfers data with the host microcomputer according to synchronous serial communications.

Figure 16:
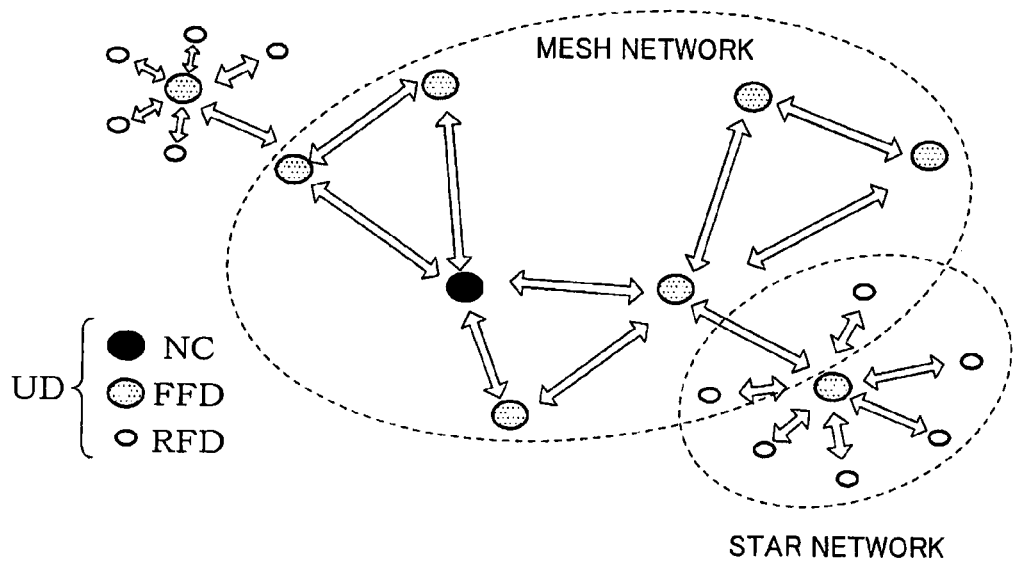
FIG. 16 is an explanatory diagram of a personal area network (PAN) implemented with ZigBee.

The network layer shown in FIG. 15 defines the topology of the PAN, which is constructed of devices. As shown in FIG. 16, a mesh network can be constructed of FFDs (including NCs) capable of transmitting data among a plurality of devices, while a star network is constructed of an FFD and RFDs. The application interface layer shown in FIG. 15 defines specifications on the network layer for interfacing with the application layer on the host. In this embodiment, the appliance control application 403d corresponds to the application layer on the primary remote controller 50M (the base unit 50 in FIG. 3), and a remote control communication application 603a corresponds to the application layer on the electric device 600 (see FIG. 5).

As described above, the second wireless communication network SW of this embodiment treats the primary controller wireless subtransceiver 3 and the plurality of electric appliance wireless transceivers 317 as unit devices UD, each with a device ID. The communication protocol used on the second wireless communication network SW can be summarized as follows. First, the offset QPSK technique is used to perform primary modulation of the carrier wave according to the baseband signal. Next, the spectrum is spread in a secondary modulation performed according to the direct-sequence spread spectrum technique. As shown in FIG. 17, frames 20 arranged in a time sequence comprise in the following order the beacon field BF disposed at the head of the frame for holding a beacon signal, the first field CAP following the beacon field BF for holding a device ID that can be accessed by all unit devices UD, the second field CFP following the first field CAP for holding transmission data that can be accessed only by the unit device UD corresponding to the device ID, and the third field PF that prohibits access from all unit devices UD. The unit device UD that is the source of transmission data repeatedly transmits the frame 20 at predetermined fixed intervals, while the remaining unit devices UD begin a process to acquire the frames by detecting the beacon signal transmitted in the frames 20 and analyze the device ID in the first field CAP. The unit devices UD acquire the transmission data stored in the second field CFP only when the device ID corresponds to themselves, and enter a sleep mode when the beacon signal is idle for more than a prescribed time. The unit devices UD are awakened from the sleep mode repeatedly at fixed intervals by a wakeup timer.

Therefore, the second wireless communicating means connecting the primary remote controller (base unit) with the electric devices targeted for control in the present invention is configured of a short-distance bi-directional wireless network implemented by a spread spectrum method using a microwave band. Wireless communications using a microwave band has a greater range than infrared communications and can achieve sufficient signal exchange, even between spaces partitioned by walls, as in a common home. Further, employing short-distance bi-directional wireless communications with a spread spectrum method dramatically increases the capacity for data transmission. It is essential to increase the data transfer capacity through this type of spread spectrum method when handling more complex control commands and response data in response to those commands being exchanged through bi-directional communications between the primary remote controller and the electric devices targeted for control, for example, and when handling device identification data (such as MAC addresses) of a greater data length for identifying individual electric devices.

The following advantages can be enjoyed by using ZigBee described above in the present invention rather than Bluetooth (Registered trademark), for example.

(1) With ZigBee, it is possible to use a beacon superframe having a relatively small frame length (127 bytes, for example) so that each device can perform detailed intermittent operations based on whether a beacon is received. The small frame is sufficient for handling this application since the data being exchanged is control transmission data and response data, which have a smaller data length than video, or voice. Further, by providing the first field CAP that can be accessed by all devices and the second field CFP that can be accessed by a specific device only adjacent to each other after the beacon field BF, and by storing identification data in the second field CFP, reception devices can easily confirm whether they are the target of the frame. By storing control transmission data (when the reception device is an electric appliance being controlled) and response data (when the reception device is the primary remote controller) in the second field CFP, which can be accessed only by this reception device, it is possible to construct a suitable data frame for centrally controlling an unspecified number of indoor household appliances.

(2) Since the offset QPSK technique can be used to transmit a large number of data bits, i.e., 16 symbols in one modulation, fewer steps are required to transmit one frame. In addition, this technique employs the direct-sequence spread spectrum method, which is simpler than the frequency hopping method employed by Bluetooth, for example, and has a transmission bit rate of about one-third that of Bluetooth, thereby greatly simplifying the required algorithms and allowing a much lighter hardware structure. Further, since this technique has a simple frame structure and a simple protocol predicated on beacon detection, communications can be initiated in less than 100 ms (20-80 ms, for example), while the startup process for Bluetooth is more involved and requires about 3 seconds.

The features described above are particularly significant when constructing an infrastructure for a wireless controller (remote controller 610) in the electric devices being controlled, as shown in FIG. 5. Specifically, most household appliances are required to give some kind of response within 100-200 ms after the user presses an operating button (a delay any longer than that will give the user a sense of unease). The startup characteristics of ZigBee described above can sufficiently keep pace with the startup time of the remote controller (100-200 ms). Further, owing to the power-saving ability described above, devices using ZigBee can be used continuously for several years on a primary battery, such as a AA or AAA battery. Bluetooth is less appealing as a remote control infrastructure since its startup time is somewhat long. Further, since the battery life for Bluetooth devices is on the order of several hours, a secondary battery is essential.

As is clear from the above description, a ZigBee-compliant remote controller for household appliances is a strong candidate for replacing appliance remote controllers using an infrared system. When the present invention is used in the remote control of household appliances (electric devices targeted for control) having a remote control system using ZigBee, the household appliances must be configured to communicate with a plurality of devices according to ZigBee, and at least the remote controller and a primary remote controller (base unit). Hence, the primary controller wireless subtransceiver 3 in the primary remote controller 50M (see FIG. 3), as well as the electric appliance wireless transceivers 317 (see FIG. 5), must be configured as a full-function device so that a mesh network can be formed between the full-function devices. In other words, by configuring the primary controller wireless subtransceiver 3 as a full-function device capable of forming a mesh network, a wireless telephone system having the extended function of remotely controlling a group of household appliances employing ZigBee can easily be made suitable to a PAN naturally constructed of these household appliances.

Next, the structure of the wireless telephone system of this embodiment will be described in greater detail with reference to the block diagrams in FIGS. 3-5. Both the base unit 50 and the handset 100 are digital wireless telephone devices. In the block diagram of the base unit 50 in FIG. 3, the base unit wireless transceiver 2 has a configuration commonly used in digital wireless telephones known in the art and includes a high-frequency analog front end unit 200A and a digital processor 200D.

The high-frequency analog front end unit 200A includes an antenna 201 for communicating with handsets 100, a transmission/reception switching circuit 202 fox switching between transmission and reception, a reception amplifier 203 for amplifying the signal received via the transmission/reception switching circuit 202, and a frequency synthesizer 207 for outputting a carrier signal. The high-frequency analog front end unit 200A further includes a quadrature modulation mixer 209 for performing multilevel modulation on the carrier signal outputted from the frequency synthesizer 207 according to a baseband signal for transmission and for transmitting the modulated signal via a transmission amplifier 208 and the transmission/reception switching circuit 202 from the antenna 201 as a radio wave transmission, and a mixer 204 for removing the carrier wave from a radio wave received from the antenna 201 via the transmission/reception switching circuit 202 and reception amplifier 203 to extract the baseband signal.

The extracted baseband signal wave received by the digital processor 200D passes through an intermediate frequency filter 205 and is inputted into a channel codec 206. The channel codec 206 extracts the baseband signal from the channel specified by the main microcomputer 4 and inputs this baseband signal into a voice processor 212. The voice processor 212 digitally encodes the baseband signal to produce digital voice data, converts the digital voice data back into an analog voice waveform, amplifies the signal, and outputs the result as voice from a receiver 214. The voice processor 212 also converts analog voice waveforms inputted through a microphone 215 into digital voice data by pulse encoding, converts the digital voice data to a baseband signal waveform (analog) in the form of a pulse wave for modulation, and inputs the resulting waveform into the channel codec 206. The channel codec 206 extracts data based on the channel specified by the main microcomputer 4 and inputs the data into the quadrature modulation mixer 209 via a baseband filter 210.

The digital processor 200D also has a speaker 216 for enabling hands-free calls, a message memory 219 connected to the voice processor 212 for saving voice data for a message recorder, and a guidance voice data memory 218 storing guidance voice data used for passing on control data notifications to the user that is connected to the voice processor 212 via a voice synthesizer 217.

The fax/copier unit 5 is configured of an image reader 502, a recording unit 503, an image processor 504, a modem 505, and a microcomputer 501 for controlling operations of these devices 502-505. Since the components of the fax/copier unit 5 are well known in the art, a description will not be included herein.

The main microcomputer 4 is configured of a CPU 401, a RAM 402, a ROM 403, a nonvolatile memory 404 configured of EEPROM or flash memory, and an input/output unit, 405 all connected to one another via an internal bus 406. The ROM 403 stores a group of applications used to perform basic functions of a wireless telephone that are well known in the art, such as a call controlling application 403a for connecting to an external telephone network to establish a call, a fax controlling application 403b for controlling the fax/copier unit 5, and a handset communicating application 403c for controlling call processes and transmission processes with the handset 100 via the first wireless communication network MW. The ROM 403 also stores the appliance control application 403d mentioned earlier for communicating the electric devices 600 bidirectionally.

The nonvolatile memory 404 is provided with a device registration area 404a, an auxiliary identification data storage area 404b, a control status management storage area 404f, and a telephone directory 404c for recording the user's telephone contacts. The input/output unit 405 is further connected to an on-hook/off-hook switch 407 controlling the connection to the telephone line, a dialing control unit 408 having buttons for dialing telephone numbers, a lamp module 409 for lighting lamps in the buttons, a display 410 configured of a liquid crystal display, and various operating buttons 411.

The primary controller wireless subtransceiver 3 is configured of a high-frequency analog front end unit 300A and the digital processor 300D. The device 300D is configured of a single-chip LSI (such as the ML7065 LSI manufactured by Oki Electric Industry Co.) capable of implementing the functions of ZigBee described above in compliance with IEEE 802.15.4. From the side nearest the main microcomputer 4, the device 300D includes the synchronous communication interface unit 315 functioning as the host interface layer, a MAC unit 314 functioning as the MAC layer, a physical unit (PSY unit) 313 functioning as the physical layer, and a RF unit 316 functioning to establish a connection with the high-frequency analog front end unit 300A. These functions have already been described based on their corresponding layer. The RF unit 316 also includes the modulator 311 for transmissions, a demodulator 306 for receptions, and an RF controller 312 that is connected to the other two. The modulator 311 converts baseband signal data received from the physical unit 313 after undergoing digital processing for primary and secondary modulations to a digital baseband waveform signal, receiving data for this waveform modulation from the RF controller 312. The demodulator 306 performs the opposite operation on the reception.

In the high-frequency analog front end unit 300A, a D/A converter 310 converts the digital baseband waveform signal received from the modulator 311 into an analog waveform. A mixer 309 modulates a carrier signal outputted from a frequency synthesizer 307 according to the baseband waveform signal and outputs the resulting transmission radio wave from an antenna 301 via a transmission amplifier 308 and a transmission switching circuit 302 to the electric devices being controlled. When a reception radio wave is received by the antenna 301, on the other hand, a mixer 304 removes the carrier wave after the signal passes through the transmission switching circuit 302 and a reception amplifier 303. The extracted baseband signal is inputted into the demodulator 306 via an intermediate frequency filter 305.

Referring to FIG. 4, the handset 100 includes a handset wireless transceiver 102 has the same electrical structure as the base unit wireless transceiver 2 of the base unit 50 excluding the voice synthesizer 217, the message memory 218, and the message memory 219. Therefore, parts and components sharing the same functions as the base unit 50 have been designated with the same reference numerals to avoid duplicating description. Components that are specific to the base unit 50, such as the fax unit, message memory, and voice synthesizer are not included in the handset wireless transceiver 102. Further, the handset 100 in FIG. 4 does not function as the primary remote controller and does not communicate directly with the electric devices being controlled.

The main microcomputer 104 is configured of a CPU 1401, a RAM 1402, a ROM 1403, a nonvolatile memory 1404 configured of EEPROM or flash memory, and an input/output unit 405 all connected to one another via an internal bus 106. The ROM 1403 stores a base unit communication application 1403a for controlling call processes and transmission processes with the base unit 50 via the first wireless communication network MW, and an appliance control process application 1403d for communicating the electric devices 600 through the base unit 50 bidirectionally. The appliance control application 1403d implements the following functions.

A control transmission data transmitting function for transmitting control transmission data to the base unit 50 for controlling the electric devices 600

A response data receiving function for receiving data from the electric devices 600 through the base unit 50 in response to the control transmission data The nonvolatile memory 1404 is provided with a telephone directory (not shown) for recording the user's telephone contacts. The input/output unit 405 has the same structure as the input/output unit 405 of the base unit 50, and is further connected to an on-hook/off-hook switch 407 controlling the connection to the telephone line, a dialing control unit 408 having buttons for dialing telephone numbers, a lamp module 409 for lighting lamps in the buttons, a display 410 configured of a liquid crystal display, and various operating buttons 411. These elements 407, 408, 409, 410, and 411 of the handset 100 are similar to the corresponding elements 407, 408, 409, 410, and 411 of the base unit 50. Therefore, the detailed explanation will be not described.

The electric device 600 in FIG. 5 includes the electric appliance wireless transceiver 317 having the same hardware structure as the primary controller wireless subtransceiver 3 in the base unit 50 of FIG. 3, and similar parts and components have been designated with the same reference numerals to avoid duplicating description.

The main microcomputer 604 of the electric device 600 includes a CPU 601, a RAM 602, a ROM 603, and an input/output device 605 all connected to one another via an internal bus 606. The ROM 603 stores the remote control communication application 603a for exchanging control transmission data and response data with the base unit 50 via the second wireless communication network SW. In other words, the remote control communication application 603a implements the following functions.

A receiving function for receiving control transmission data from the base unit 50 via the second wireless communication network SW A transmitting function for transmitting the response data to the base unit 50 via the second wireless communication network SW The input/output unit 605 is further connected to the main operating circuit 7 to communicate the main operating circuit 7 of the electric device 600 bidirectionally.

Figure 2:
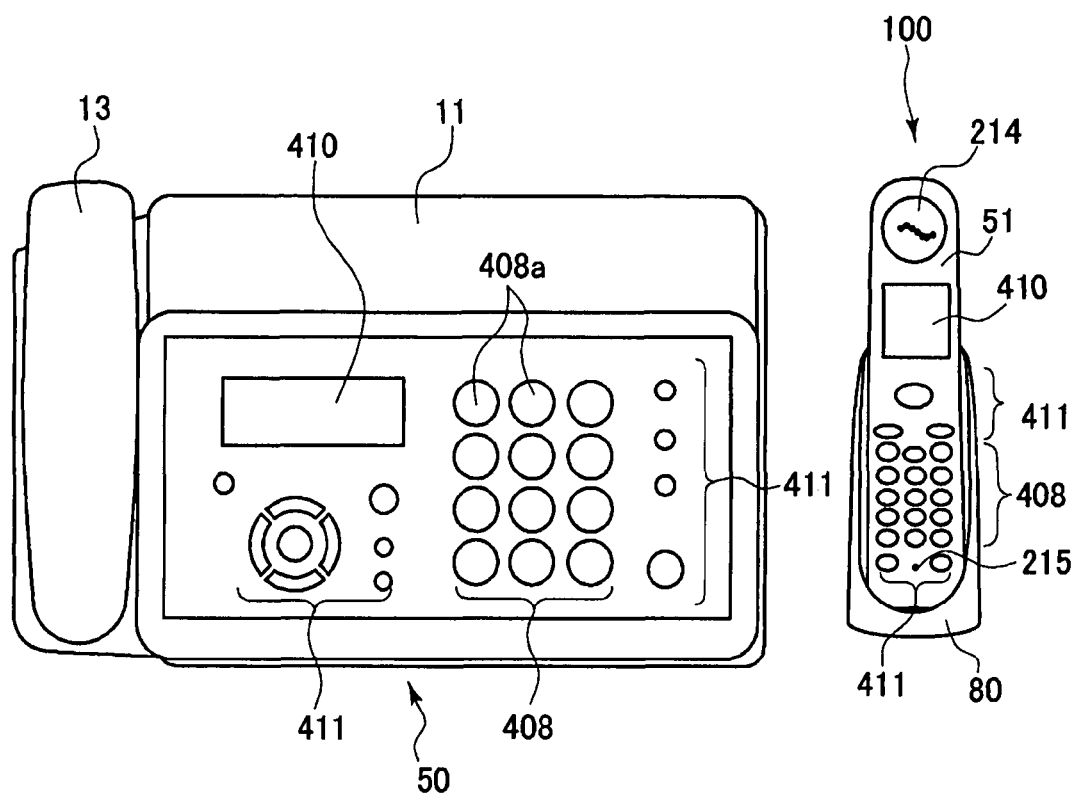
FIG. 2 is an explanatory diagram showing the external appearance of a base unit and a handset.

FIG. 2 shows the outer appearance of the base unit 50 and the handset 100. Components already described in the block diagrams are arranged as shown in FIG. 2. The base unit 50 also includes an outer casing 11, and a receiver 13 provided with a speaker and microphone. The handset 100 also includes an outer casing 51 detachably supported by a holder 80.

Next, the functions of the wireless telephone system 1 in FIG. 1 will be described in greater detail.

As illustrated in FIG. 1, the primary remote controller 50M transmits control transmission data to the electric devices 600 via the second wireless communication network SW. If this control transmission data is command data for issuing a command to perform a predetermined operation on one of the electric devices 600, the electric device 600 receiving the command performs an operation corresponding to the content of the command data. For example, if the command involves turning on or off the power supply, the electric device 600 performs a control process to turn on or off the power supply. If the electric device 600 is an air conditioner, the command may include instructions to adjust the temperature or airflow. If the device is an air conditioner, audio-visual equipment, or an electric water supply apparatus for the bath, the command may include instructions to set a timer for starting an operation at a specified time.

The electric device 600 returns response data reflecting the results of its own control process performed according to the above command data to the primary remote controller 50M via the second wireless communication network SW. For example, if the command data is a command to turn on or off the power supply of the electric device 600, the response data indicates the results of the control process performed by the electric device 600 to turn on or off the power supply.

As shown in FIG. 3, the nonvolatile memory 404 of the primary remote controller 50M includes the device registration area 404a. The device registration area 404a serves to register the plurality of electric devices 600 in association with device identification data, such as device IDs 72 shown in FIG. 7. The primary remote controller 50M also acquires destination device specification data, such as a button number 71, specifying the electric device 600 that is the destination of the control transmission data. Based on the acquired button number 71, the primary remote controller 50M identifies the targeted electric device 600 by the corresponding device ID 72 in the device registration area 404a and transmits this device ID 72 together with the control transmission data from the primary controller wireless subtransceiver 3. The primary remote controller 50M also receives response data together with the device ID 72 of the correspond electric device 600 with the primary controller wireless subtransceiver 3. The device ID is data uniquely assigned to each type of electric device 600. The MAC address is used in this embodiment.

The destination device specification data is the button number 71 acquired in the form of input data selecting an electric device 600 that the user has inputted into an input area of either the base unit 50 or the handset 100 used to specify a destination device. The dialing control unit 408 (or alternatively the operating buttons 411) provided on both the base unit 50 and handset 100 is appropriated for use as the input area for specifying a destination device. The base unit 50 and handset 100 can easily select an electric device 600 as the target of remote operations based on data inputted through this input area (for example, data inputted by the push of a button). When data inputted through the dialing control unit 408 (or the operating buttons 411) of the handset 100 is used as the destination device specification data, the handset 100 must perform a process to transmit the specification data to the base unit 50 via the first wireless communication network MW.

As shown in FIG. 7, the device registration area 404a registers electric devices 600 by individually assigning the button number 71 to the electric device 600. The button number 71 corresponds to an operating button 408a in the dialing control unit 408 provided in the base unit 50 and handset 100. In this case, the operating buttons 408a function as the input area for specifying destination devices. Hence, if the user knows with which button the electric device 600 is registered, the user can easily select the electric device 600 by operating the button of that number.

In this embodiment, the base unit 50 has been set as the primary remote controller 50M, and the handset 100 is provided with an operation input area for use as the input area for specifying the destination device. Specifically, the dialing control unit 408 of the base unit 50 or the handset 100 has been appropriated as this input area. When the user operates the operation input area of the handset 100, the handset 100 transmits input data selecting one of the electric devices 600, such as the button number 71 shown in FIG. 7, to the base unit 50 via the first wireless communication network MW. The base unit 50 relays the command issued from the handset 100 with the device ID to the selected electric device 600. Further, when the base unit 50 receives response data for control results from the electric device 600, the base unit 50 transmits this response data together with the device ID to the handset 100 via the first wireless communication network MW. The handset 100 can output details of the response data for the control results in a variety of formats capable of identifying the corresponding electric device 600. With this system, the handset 100 can select an electric device 600 via the base unit 50 (primary remote controller 50M) and receives response data received from the electric device 600 through the base unit 50. Hence, the user of the handset 100 can easily and smoothly perform remote operations on the electric device 600 at a position separated from the base unit 50, such as from a different room than the base unit 50. The method in which the handset 100 receives response data will be described later, but may be configured of a visual outputting method using the lamp module 409 provided integrally with the dialing control unit 408 or the display 410, or an audio outputting method using the receiver 214 or the speaker 216 (see FIG. 4).

The control transmission data transmitted from the primary remote controller 50M (the base unit 50) may also be notification request command data requesting the electric device 600 to transmit control status notification data, such as on/off data 73 shown in FIG. 7, and report the current control status of each electric device to the primary remote controller 50M. In this case, response data returned from the electric device 600 is control status notification data related to the notification request command data. The control status notification data can be received at both the base unit 50 and handset 100. In other words, the control status notification data is not only received at the base unit 50, which is the primary remote controller 50M, but also received at the handset 100 by transferring the report from the base unit 50 via the first wireless communication network MW. The control status notification data is indicated on both the base unit 50 and handset 100 according to a visual outputting method using the lamp module 409 formed integrally with the dialing control unit 408 or the display 410, or according to an audio outputting method using the receiver 214 or speaker 216 (see FIG. 4).

The primary remote controller 50M (base unit 50) receives the control status notification data from the plurality of electric devices 600 together with the device IDs 72. As described above, the primary remote controller 50M has the control status management storage area 404f provided in the nonvolatile memory 404. As shown in FIG. 7, the control status management storage area 404f stores the control status notification data received from the electric device 600, represented by the on/off data 73 for the device, in association with the device ID 72 (MAC address in this embodiment) serving as control management data. Both the base unit 50 and handset 100 are capable of receiving control management data, which is the on/off data 73 stored in the control status management storage area 404f for example. When the base unit 50 is set as the primary remote controller 50M, the base unit 50 transmits the control management data (on/off data 73) to the handset 100 via the first wireless communication network MW, enabling the handset 100 to receive the control management data for the user. Specifically, the handset 100 issues a request to the base unit 50 via the first wireless communication network MW for the transmission of control management data. Upon receiving this transmission request, the base unit 50 transmits the control management data to the handset 100.

The control status management storage area 404f shown in FIG. 7 stores control status notification data, such as the on/off data described above, for each of the electric devices 600 registered in the device registration area 404a. Upon receiving response data for control results from the electric device 600, the main microcomputer 4 updates the control status notification data corresponding to the electric device 600 in the control status management storage area 404f based on the received response data.

Figure 6:
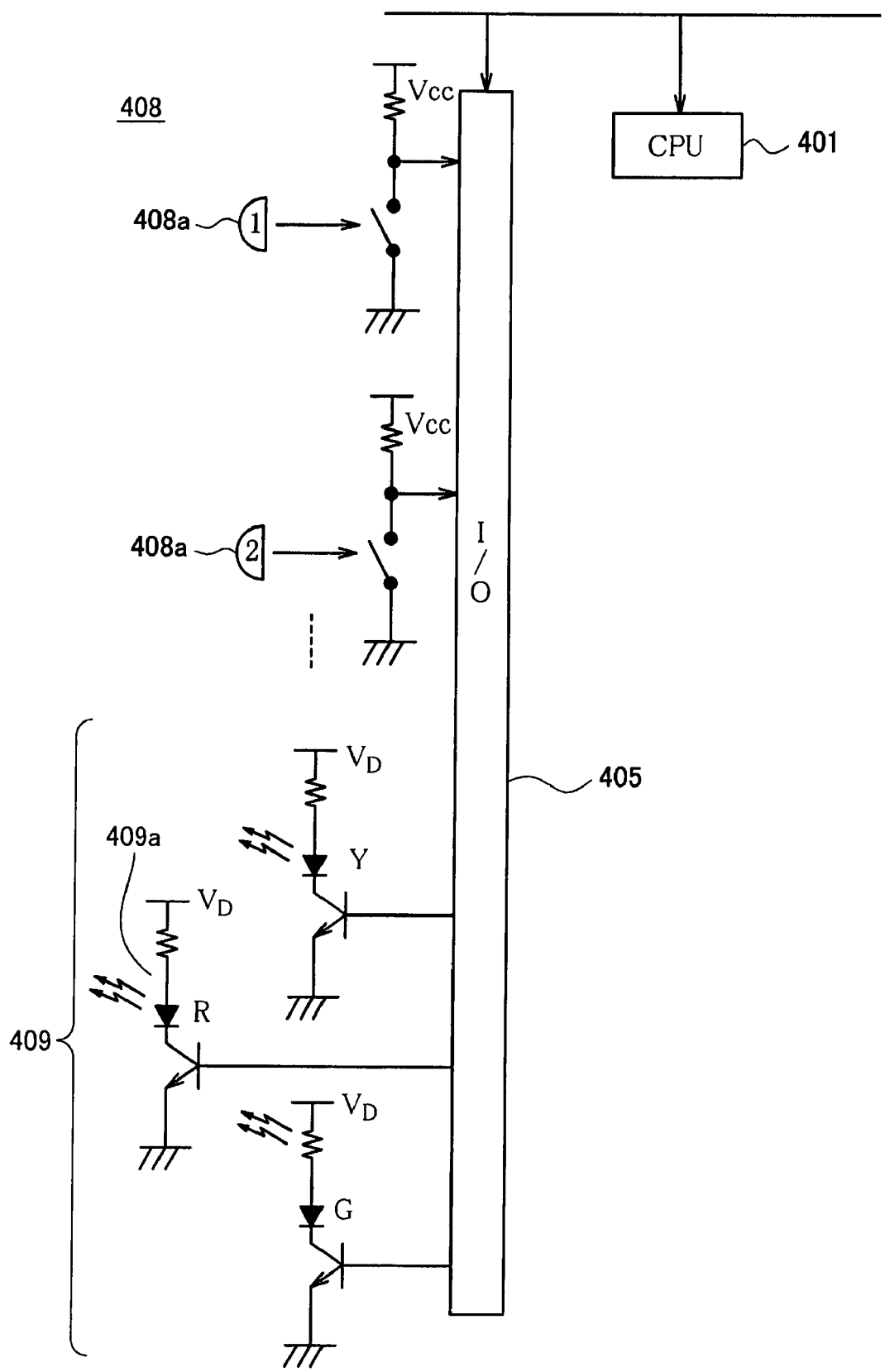
FIG. 6 is a circuit diagram showing the electrical structure of a dialing control unit and a lamp module.

Referring to FIG. 6, the dialing control unit 408 in the base unit 50 and handset 100 each has the operating buttons 408a. Light-emitting elements 409a of the lamp module 409 are provided for each of the operating buttons 408a and function to output the on/off data 73 of the electric device 600 assigned to each operating button 408a by lighting or not lighting. The light-emitting elements 409a are provided associated with the operating buttons 408a. The operating buttons 408a are formed of a translucent resin, so that the lit state of the light-emitting elements 409a can be seen through the operating buttons 408a. With this construction, the user can visually determine the control status of the electric device 600 registered to an operating button 408a based on the lit state of the light-emitting element 409a within that operating button 408a. It is possible to identifiably display different control states for an electric device 600 assigned to an operating button 408a by lighting the light-emitting elements 409a in different patterns of emission. Further, the light-emitting elements 409a in the operating buttons 408a may also be configured to illuminate in a plurality of colors. In this case, the different control states for an electric device 600 assigned to an operating button 408a can be identifiably displayed by lighting the light-emitting element 409a in the corresponding operating button 408a in different luminescent colors. The differing control states of each electric device 600 can easily be rendered through a simple circuit (or software) structure used to control the lighting pattern or color of the light-emitting elements 409a. By turning off the light-emitting elements 409a in operating buttons 408a that have not been assigned an electric device 600, the user can easily determine which of the operating buttons 408a are available to be assigned to an electric device to be controlled.

FIG. 6 shows the circuit structure of the operating buttons 408a and light-emitting elements 409a of the base unit 50 and the handset 100. Switches are provided on the input/output unit 405 in the main microcomputer of the base unit 50 and handset 100 for changing the input level to the input/output unit 405 between two values based on the pressed state of the corresponding operating button 408a. Hence, the main microcomputer can recognize the pressed state of the operating buttons 408a based on the input state of the switches. Each of the light-emitting elements 409a includes a plurality of light-emitting diodes of different colors (yellow (Y), red (R), and green (G)), each of which diodes is connected to a drive transistor via a current-limiting resistor. Each drive transistor switches the corresponding light-emitting diode on and off independently based on a control signal from the input/output unit 405.

The control status management storage area 404f in FIG. 7 stores the device IDs 72 of the electric devices 600 in association with the assigned button numbers 71 and the on/off data 73 for the respective electric devices 600 serving as the control status notification data. A process utilizing this control status management storage area 404f will be described according to the flowchart in FIG. 12. The process is executed mainly by the handset communicating application 403c and the appliance control application 403d of the base unit 50; the base unit communication application 1403a and the appliance control process application 1403d of the handset 100; and the remote control communication application 603a of the electric device 600. This process is the case in which the handset 100 transmits control transmission data to the electric device 600 through the base unit 50, and receives response data from the electric device 600 through the base unit 50.

Figure 12:
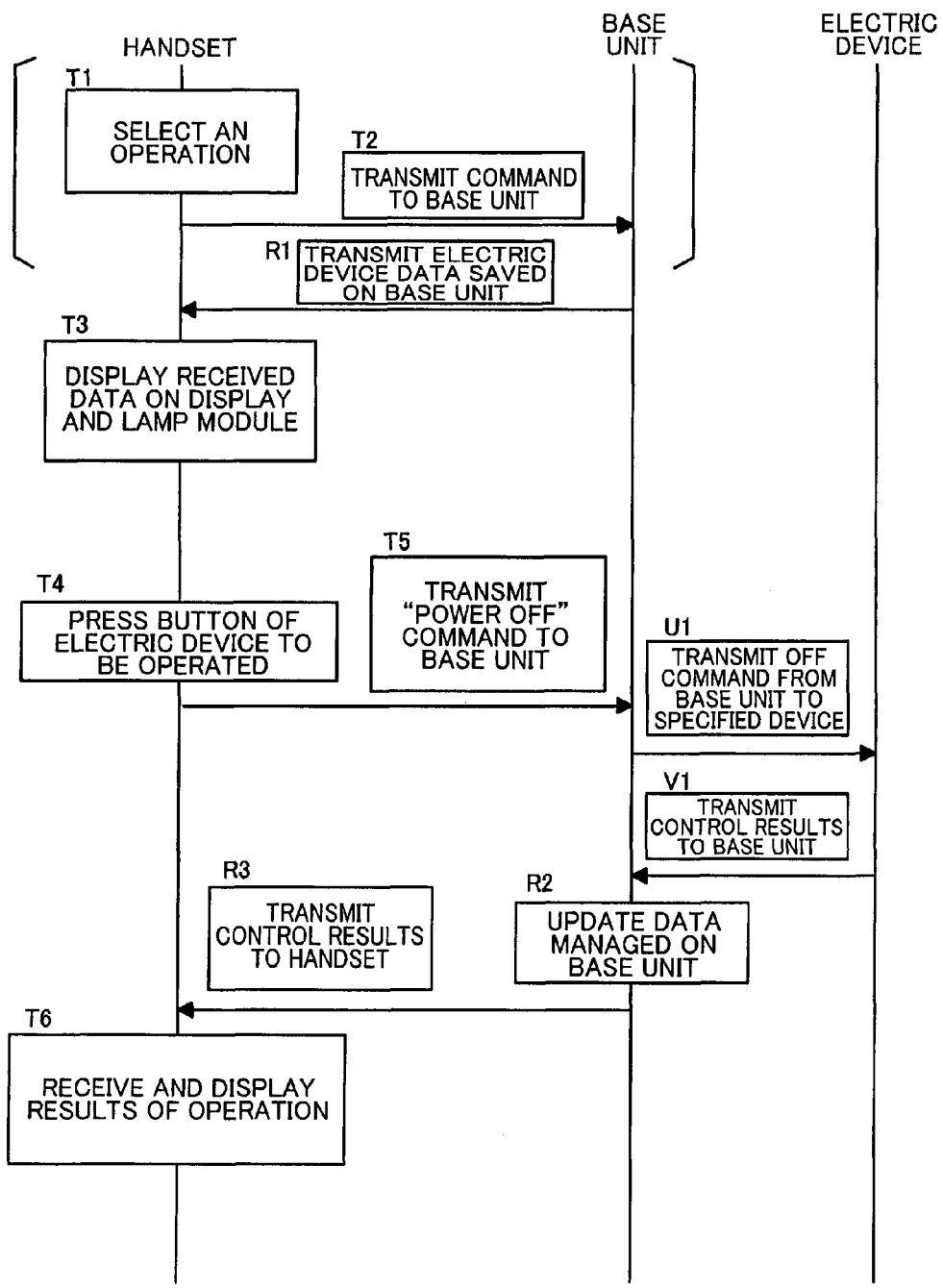
FIG. 12 is a flowchart illustrating steps in a control process for controlling communications among the base unit, handset, and electric devices.
Figure 13:
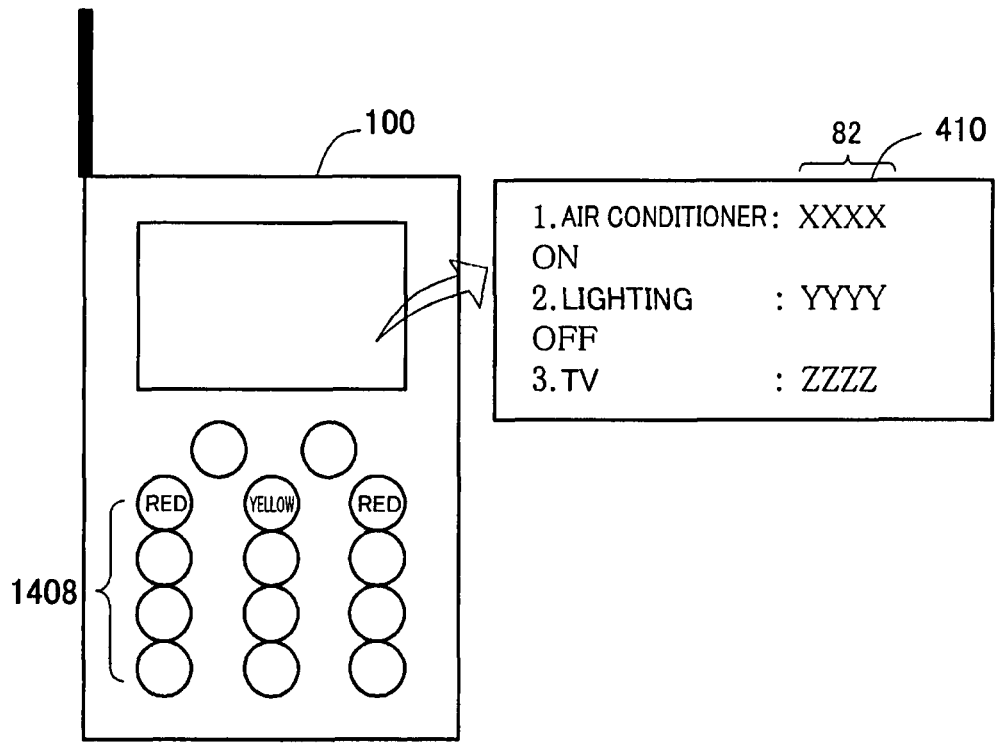
FIG. 13 is an explanatory diagram illustrating operations on the handset.

Referring to FIG. 12, when the user performs a specific button operation on the handset 100 to select an electric appliance operation (T1), the handset 100 transmits a signal requesting control status notification data to the base unit 50 (T2). In response, the base unit 50 transmits the content stored in the control status management storage area 404f to the handset 100 (R1). The handset 100 references this data and sets the light-emitting element 409a of the operating button 408a corresponding to the electric device 600 to a predetermined lit state indicating the corresponding on or off state of the electric device 600 (T3). FIG. 13 shows an example of lit buttons on the handset 100 after acquiring the control status notification data from the base unit 50. In this embodiment, an air conditioner has been registered to the first button, lighting to the second button, and a television to the third button. A continuous red light indicates that the power to the corresponding device is on, and a flashing yellow light indicates that the power is off. Buttons to which no electric device has been registered are unlit.

Each time an operating button corresponding to one of the electric devices is pressed, control command data for switching the power on and off is transmitted to the electric device. For example, in order to turn off the power of the air conditioner currently in the on state shown in FIG. 13, the user presses the operating button "1" to which the device is registered (T4). Upon detecting that the operating button "1" has been pressed, the handset 100 transmits a "power off" command to the base unit 50 via the first wireless communication network MW (T5).

Upon receiving this command, the base unit 50 integrates a source ID (for the base unit 50), a destination ID (the device ID "abcd" correspond to the air conditioner), and the content of the command "power off" in the frame shown in FIG. 17 and transmits this frame over the second wireless communication network SW of the PAN configured with ZigBee (U1). The air conditioner receives this frame, extracts the command content "power off," and performs the necessary control process to turn off the power. Subsequently, the air conditioner transmits response data for the results of the control process indicating that its own status is now "power off" together with the source ID (the device ID "abcd" for the air conditioner) and the destination ID (for the base unit 50) over the second wireless communication network SW in the PAN (V1).

Upon receiving this data, the base unit 50 changes the on/off data 73 in the control status management storage area 404*f* corresponding to the extracted source ID (i.e., for the air conditioner) from on to off (R2) and transmits the details of this change to the handset 100 over the first wireless communication network MW (R3). Upon receiving this data, the handset 100 similarly overwrites the control status notification data already received from the base unit 50 and controls the light-emitting unit for the operating button "1" to begin flashing yellow to indicate that the power is off (T6).

In this embodiment, the display 410 provided in at least one of the base unit 50 and handset 100 also displays the on/off data 73 of the electric devices 600 registered in the device registration area 404*a*. With the display 410, it is possible to display both the registered status and the control status of the electric devices 600 in a clearer and more detailed manner.

As shown in FIG. 3, the nonvolatile memory 404 of the primary remote controller 50M also includes the auxiliary identification data storage area 404*b*. The auxiliary identification data storage area 404*b* stores auxiliary specification data 80 that includes at least one of a product type 81 and a manufacturer name 82 for the electric devices 600 (see FIG. 7). As shown in FIG. 8, the display 410 also displays the type 81 of the electric devices 600 registered in the device registration area 404*a* and manufacturer names 82 read from the auxiliary identification data storage area 404*b*, and the on/off data 73. By acquiring the product type 81 and manufacturer name 82 of the electric devices 600 (from the electric devices 600 over the second wireless communication network SW) and displaying this data on the display 410, the base unit 50 and handset 100 facilitate the user in remembering which electric device 600 in which room corresponds to the control status based on the displayed product type 81 and manufacturer name 82. Hence, this display assists the user in appropriately selecting the electric device 600 for a remote control operation.

However, the number of types and manufacturers of commercial household appliances serving as the electric devices 600 can be enormous, making it very troublesome for the user to check and register each appliance. The following configuration can be used to eliminate this troublesome task. As shown in FIG. 7, the primary remote controller 50M receives device IDs 72, such as the MAC address described above, from the electric device 600 via the second wireless communication network SW and registers the electric devices 600 based on these device IDs 72 in the device registration area 404*a*. Next, the primary remote controller 50M stores the auxiliary specification data 80 of the electric devices 600 in association with these device IDs 72 in the auxiliary identification data storage area 404*b*. Hence, the nonvolatile memory is configured to store device IDs 72 and auxiliary specification data 80 corresponding to an unspecified number of electric devices 600. The auxiliary specification data 80 corresponding to the device IDs 72 stored in the device registration area 404*a* are read from the auxiliary identification data storage area 404*b* and displayed in a list on the display 410.

Figure 14:
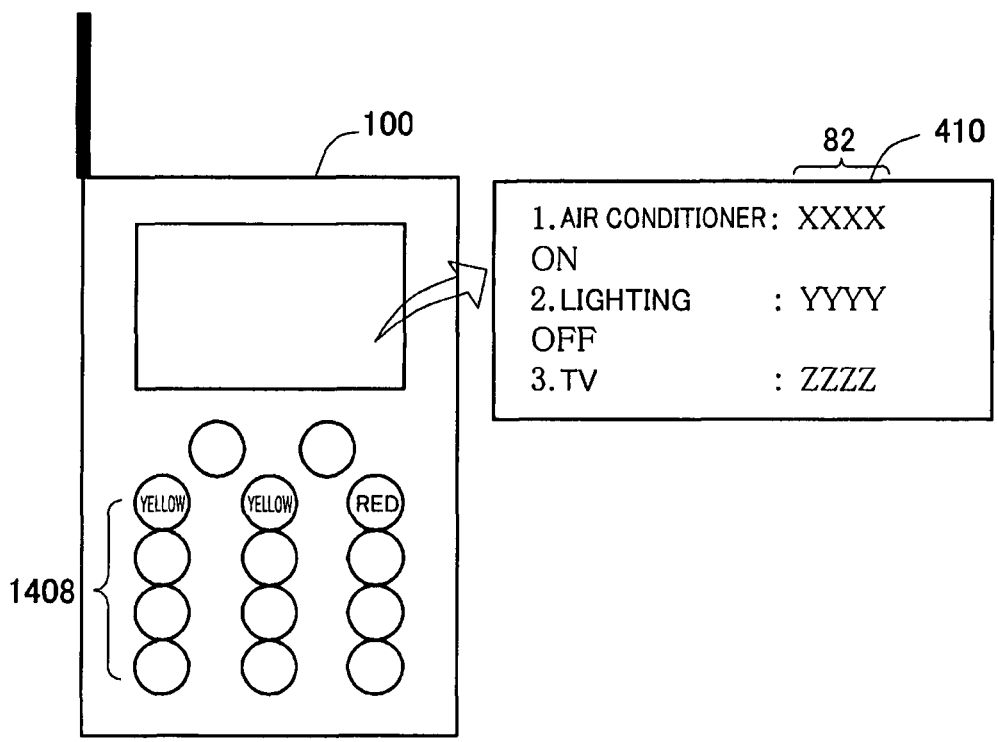
FIG. 14 is an explanatory diagram illustrating operations on the handset.

As shown in FIGS. 13 and 14, the electric devices 600 registered in the device registration area 404*a* and the on/off data 73 for the electric devices 600 can be displayed in a list on the display 410 in association with the numbers of the assigned operating buttons 408*a* in the dialing control unit 408 provided on the base unit 50 and the handset 100. In this way, the user can easily see which electric device 600 is registered to which operating button 408*a* (such as the number of the button) from the details displayed on the display 410 to achieve more reliable and smoother remote operations.

A function for outputting the control status notification data for each electric device 600 registered in the device registration area 404*a* as voice may be provided in at least one of the base unit 50 and handset 100. By outputting the control status notification data audibly, the essential function of the telephone is used and the data is easily comprehensible. To implement this function, as shown in FIG. 3, a voice conversion module configured of the guidance voice data memory 218 and voice synthesizer 217 is provided on the base unit 50 for converting the on/off data 73 into voice data. The voice data can be transmitted to the handset 100 via the first wireless communication network MW and can be outputted as voice data from the receiver 214 of the handset 100. By providing the voice conversion module on the base unit 50 end for converting the on/off data 73 to voice data, as described above, the structure of the handset 100 can be made lighter.

Figure 9:
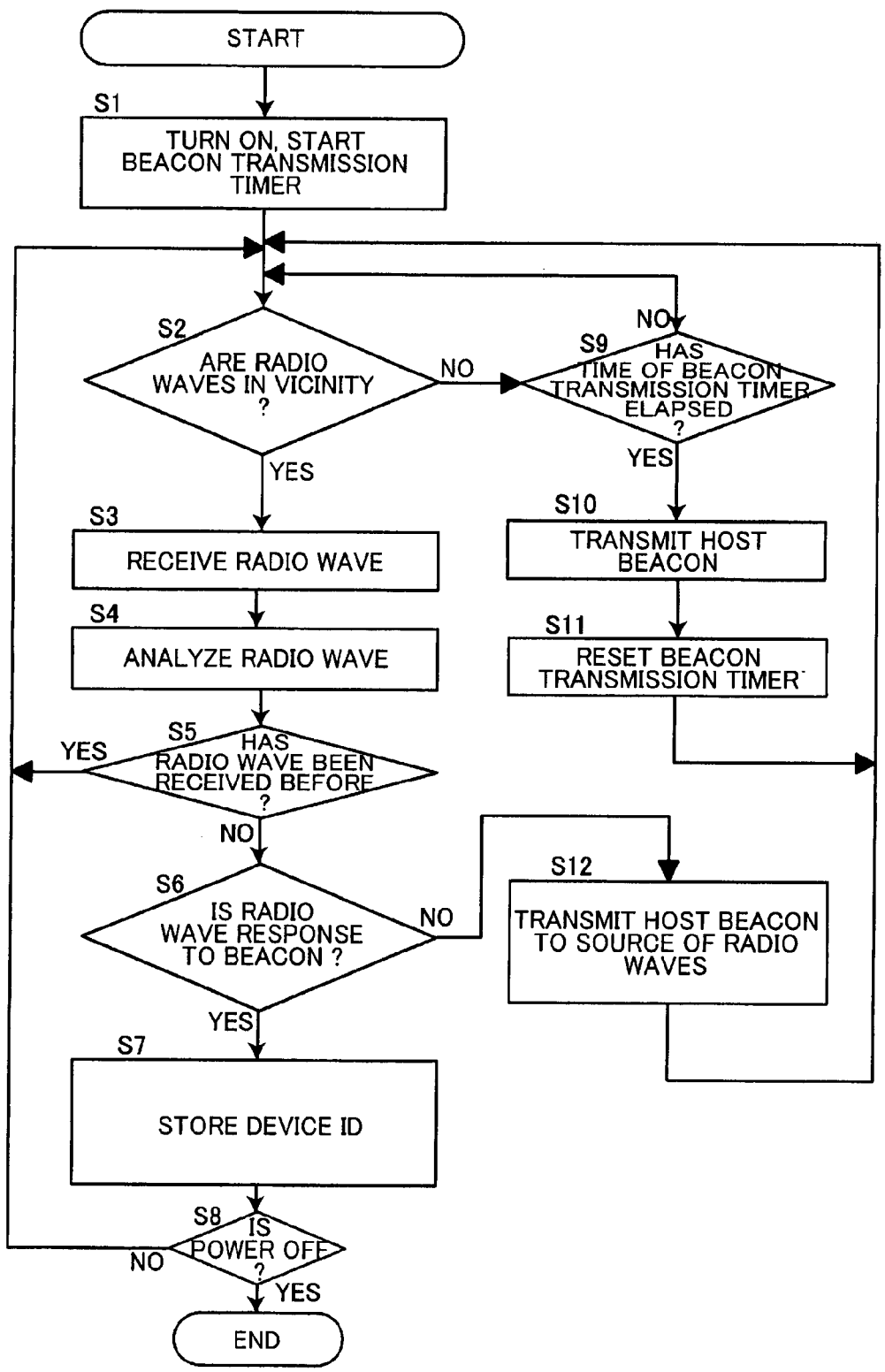
FIG. 9 is a flowchart illustrating steps in a process performed on the base unit for searching for electric devices.

Next, operation control of the wireless telephone system 1 shown in FIG. 1 will be described. FIG. 9 is a flowchart illustrating steps in a process performed on the base unit 50 (primary remote controller 50M) according to the appliance control application 403*d* to search for electric devices targeted for control. In S1 of this process, the power of the base unit 50 is turned on, starting a ZigBee beacon transmission timer. Since the electric appliance wireless transceiver 317 provided in electric devices regularly transmits a beacon signal, the base unit 50 can detect the presence of electric devices in the vicinity based on this beacon signal. Hence, in S2 the base unit 50 checks for the existence of radio waves of a strength greater than a threshold level that confirms the existence of an electric device targeted for control. If the base unit 50 detects no such strong waves, in S9 the base unit 50 determines whether the time set in the beacon transmission timer has elapsed, returning to S2 and repeating the process described above until this time has elapsed. When the time set in the beacon transmission timer has elapsed (S9: YES), in S10 the base unit 50 transmits a host beacon (frame) requesting confirmation of existence, in S11 resets the beacon transmission timer, and returns to S2 to repeat the process described above.

When the base unit 50 detects radio waves stronger than the threshold level in S2, in S3 the base unit 50 receives the radio signal (frame) and in S4 analyzes the content of the frame. If the content of the frame has already been received earlier (S5: YES), then the base unit 50 returns to S2 and repeats the process described above. However, if the content of the frame has not yet been received (S5: NO), then in S6 the base unit 50 determines whether the frame includes a response to the host beacon transmitted from the base unit 50 (confirmation of existence), such as an acknowledge signal. If no such response is included (S6: NO), in S12 the base unit 50 retransmits the host beacon with control transmission data integrated in the frame identifying the source device of the received frame as the destination and returns to S2. However, if a response is found in S6 (S6: YES), then in S7 the base unit 50 registers the source device from the content of the frame as an electric device targeted for control. In S8 the base unit 50 determines whether its own power supply has been turned off and repeats the process described above as long as the power has not been turned off.

Figure 10:
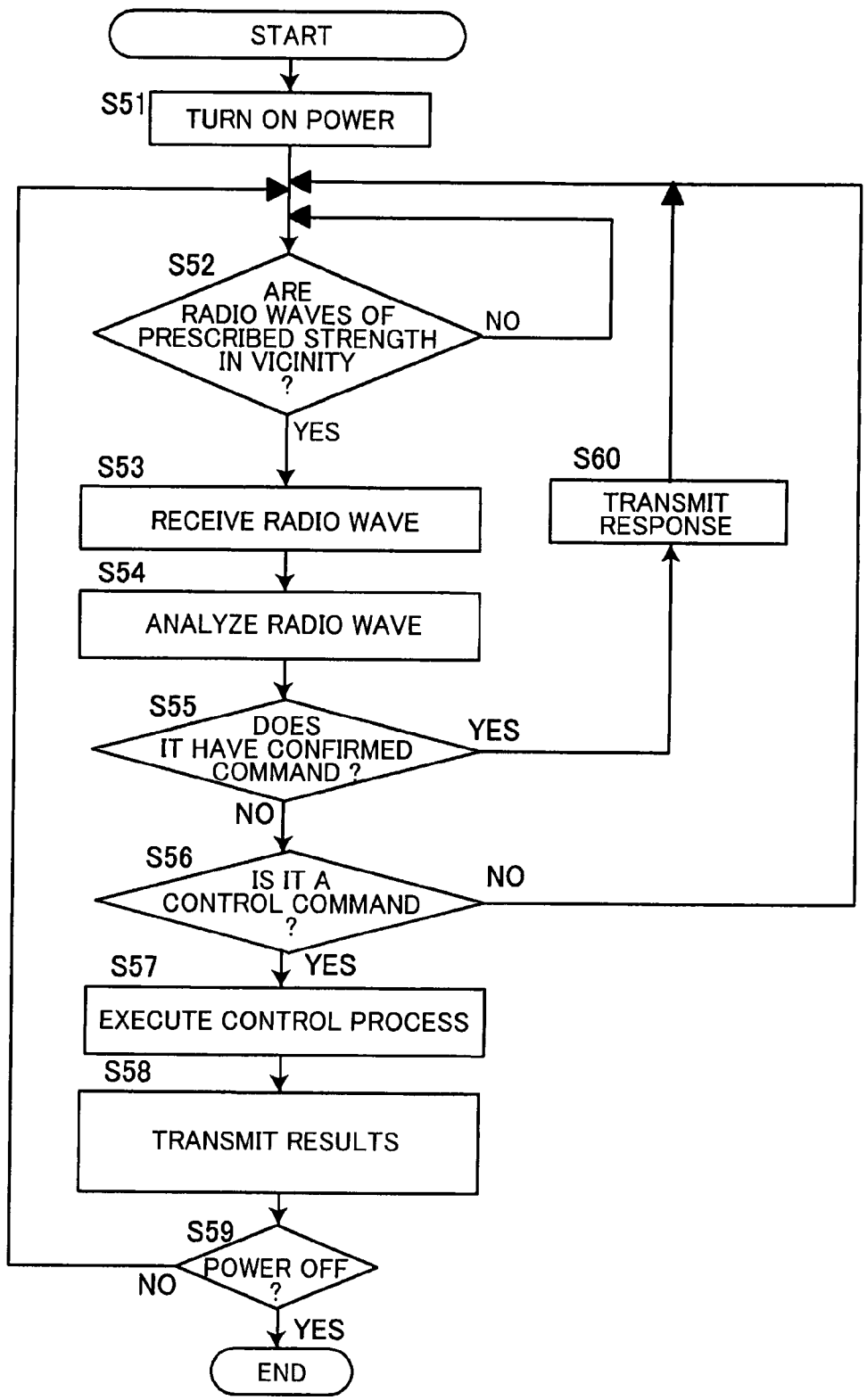
FIG. 10 is a flowchart illustrating steps in a response process performed on electric devices.

FIG. 10 is a flowchart illustrating steps in a response process performed on the electric device according to the remote control communication application 603a in FIG. 5. In S51 of this process, the power to the electric device is turned on. In S52 the device confirms whether a radio wave is present with a strength greater than the threshold level. The device loops back to the process of S52 until such a radio wave exists. When the device detects a radio wave stronger than the threshold level in S52, in S53 the device receives the radio wave (frame) and in S4 analyzes the content of the frame. If the frame includes an existence confirmation command (S55: YES), then in S60 the device transmits a response signal and returns to S52 to repeat the process described above. If the frame does not include an existence confirmation command (S55: NO) but includes a control command corresponding to control transmission data (S56: YES), then in S57 the device executes a control process based on the received control command and transmits a radio signal (frame) with response data indicating the results of the control process. In S59 the device determines whether its own power supply has been turned off and repeats the process described above as long as the power has not been turned off.

Figure 11:
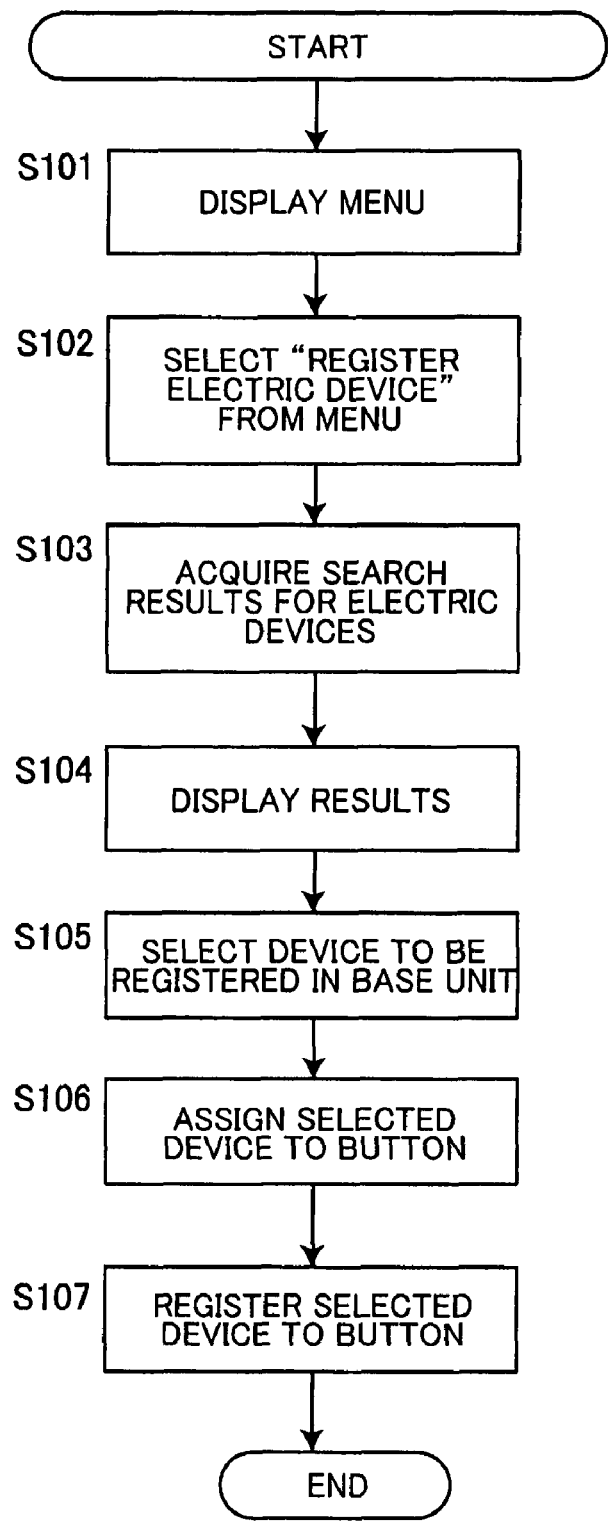
FIG. 11 is a flowchart illustrating steps performed on the base unit for registering electric devices.

FIG. 11 is a flowchart illustrating steps in a device registration process. The following system structure is advantageous for registering electric devices in the device registration area 404a. This system structure includes a function to search for unregistered electric devices by issuing a request from the primary remote controller (base unit 50) via the second wireless communication network SW to unregistered electric devices for a response acknowledging their presence to the primary remote controller; a function for receiving response data via the second wireless communication network SW from an unregistered electric device in response to the request, the response data including device identification data; and a function for registering the electric devices detected based on the response data in a device registration area based on the device ID corresponding to the unregistered electric device. The unregistered electric devices found above may be registered to available operating buttons, as in the example of FIG. 7. This process may be performed automatically the first time a new base unit 50 is set up and whenever the base unit 50 is reset and restarted. By repeatedly executing this process periodically, the base unit 50 can automatically register newly added household appliances (unregistered electric devices) in the device registration area 404a. While newly detected electric devices may be automatically registered, it is also possible to display the results of detection on the display 410, enabling the user to select only those devices desired for registration.

In S101 of the process in FIG. 11, the user displays a menu by performing a predetermined operation on the operating buttons 411 of the base unit 50 (primary remote controller 50M). In S102 the user selects a process for registering a device from the menu. In S103 the base unit 50 reads the results of the above search and reads the auxiliary specification data 80 corresponding to the device IDs 72 included in the search results by referencing the auxiliary identification data storage area 404b (see FIG. 7). In S104 the base unit 50 displays the data acquired in S103 on the display 410, as shown in FIG. 8. In S105 the user operates the operating buttons 411 to select an electric device to be registered. In S106 the user selects an operating button 408a (by pressing the button, for example) to which the electric device is to be registered, and in S107 the base unit 50 registers the device to that button.

It is understood that the foregoing description and accompanying drawings set forth the embodiments of the invention at the present time. Various modifications, additions and alternative designs will, of course, become apparent to those skilled in the art in light of the foregoing teachings without departing from the spirit and scope of the disclosed invention. Thus, it should be appreciated that the invention is not limited to the disclosed embodiments but may be practiced within the full scope of the appended claims.

What is claimed is:

1. A remote control system for remote-controlling at least one electric device, each electric device having device identification data, comprising:
    a handset comprising a handset wireless transceiver; and
    a base unit having a telephone function to make a call, the base unit comprising:
        a base unit transceiver that communicates with the handset wireless transceiver bidirectionally; and
        a primary remote-controller that communicates with the electric device bidirectionally to control the electric device; the primary remote-controller comprising:
        a remote-control transmitter that transmits control data to the electric device by using the device identification data, the control data being used for controlling the electric device;
        a remote-control receiver that receives response data from the electric device in response to the control data;
        a detecting unit that detects the electric device;
        a storage that stores the device identification data associated with the electric device; and
        a display panel,
    wherein:
        the handset transmits an instruction for controlling the electric device to the base unit,
        the base unit transmits the instruction as the control data to the electric device,
        the base unit receives a reaction of the electric device in response to the control data as the response data,
        the base unit transmits the response data to the handset,
        the base unit transmits a beacon signal,
        the base unit detects an electromagnetic wave signal having a predetermined strength;
        the base unit determines whether the detected electromagnetic wave signal is a response to the beacon signal;

the base unit identifies device identification data from the detected electromagnetic wave signal if the detected electromagnetic wave signal is the response to the beacon signal;

the base unit determines whether the identified device identification data is already registered in the base unit; and the base unit registers the identified device identification data in the base unit as the electric device which is controllable by the base unit if the device identification data is not registered.

2. The remote control system according to claim 1, wherein the control data comprises an instruction for instructing the electric device to effect a predetermined operation, and the response data includes a result indicating a reaction of the electric device in response to the instruction.

3. The remote control system according to claim 2, wherein the instruction is for controlling power supply to the electric device.

4. The remote control system according to claim 2, wherein the primary remote-controller identifies the detected electric device as a destination of the control data in accordance with the device identification data and transmits the control data with the device identification data, and the remote-control receiver receives the response data with the device identification data from the detected electric device.

5. The remote control system according to claim 4, wherein the control data includes a request that requests the electric device to report a current status thereof to the base unit as the response data, and the base unit further comprises an output unit that outputs the response data.

6. The remote control system according to claim 5, wherein the request is for confirming power supply to the electric device.

7. The remote control system according to claim 5, wherein the storage further stores the current status associated with the device identification data.

8. The remote control system according to claim 7 wherein, the primary remote-controller further comprises:

a plurality of indicators capable of lighting different colors, each of the plurality of indicators being assigned to the electric device to indicate the current status of the corresponding electric device depending on the color of the corresponding button.

9. The remote control system according to claim 7 wherein, the primary remote-controller further comprises:

a plurality of light-indicators capable of blinking at a predetermined period, each of the plurality of light-indicators being assigned to the electric device to indicate the current status of the corresponding electric device, depending on the predetermined period.

10. The remote control system according to claim 5, wherein the storage further stores the current status associated with the device identification data, the primary remote-controller renews the current status of the electric device stored in the storage upon receiving the response data.

11. The remote control system according to claim 2, wherein the primary remote-controller further comprises an input unit having an operation panel, the input unit receiving the device identification data through the operation panel.

12. The remote control system according to claim 11, wherein the operation panel has a plurality of operation buttons operationally connected to the primary remote-controller, each of the plurality of operation buttons being assigned to the detected electric device, and the storage stores the assigned operating button associated with the device identification data.

13. The remote control system according to claim 2, wherein the handset further comprises an input unit that receives the instruction, the handset transceiver transmits the instruction to the base unit transceiver, the remote-control transmitter transmits the instruction as the control data, and the base unit transceiver transmits the response data to the handset transceiver.

14. The remote control system according to claim 13, wherein the base unit further comprises an output unit that outputs the received response data.

15. The remote control system according to claim 1, wherein the handset transceiver and the base unit transceiver use a spread spectrum method using a microwave band for communication therebetween.

16. The remote-control system according to claim 1, wherein the display is configured to display the electric device registered in the base unit and a current status thereof.

17. A method for remote-control of at least one electric device by using a remote-control system, each electric device having device identification data, the remote-control system comprising a handset comprising a handset wireless transceiver, and a base unit having a telephone function to make a call; the base unit comprising a base unit transceiver that communicates with the handset wireless transceiver bidirectionally, and a primary remote-controller that communicates the electric device bidirectionally to control the electric device; the primary remote-controller comprising a remote-control transmitter that transmits control data to the electric device by using the device identification data, a remote-control receiver that receives response data from the electric device in response to the control data, a detecting unit that detects the electric device, a storage that stores the device identification data associated with the electric device, and a display panel; comprising transmitting an instruction for controlling the electric device from the handset to the base unit, transmitting the instruction as the control data from the base unit to the electric device, receiving a reaction of the electric device in response to the control data as the response data at the base unit, transmitting the response data from the base unit to the handset;

transmitting a beacon signal from the base unit;

detecting an electromagnetic wave signal having a predetermined strength;

determining whether the detected electromagnetic wave signal is a response to the beacon signal;

a identifying device identification data from the detected electromagnetic wave signal if the detected electromagnetic wave signal is the response to the beacon signal;

determining whether the identified device identification data is already registered in the base unit; and registering the identified device identification data in the base unit as the electric device which is controllable by the base unit if the device identification data is not registered.

18. The method according to claim 17, further comprising:

displaying the electric device registered in the base unit and a current status thereof.

* * * * *